United States Patent
Aithal et al.

(10) Patent No.: US 9,444,717 B1
(45) Date of Patent: *Sep. 13, 2016

(54) TEST GENERATION SERVICE

(71) Applicant: Amazon Technologies, Inc., Reno, NV (US)

(72) Inventors: Anirudh Balachandra Aithal, Seattle, WA (US); Michael David Marr, Monroe, WA (US)

(73) Assignee: Amazon Technologies, Inc., Seattle, WA (US)

( * ) Notice: Subject to any disclaimer, the term of this patent is extended or adjusted under 35 U.S.C. 154(b) by 520 days.

This patent is subject to a terminal disclaimer.

(21) Appl. No.: 13/781,347

(22) Filed: Feb. 28, 2013

(51) Int. Cl.
*G06F 15/177* (2006.01)
*H04L 12/26* (2006.01)

(52) U.S. Cl.
CPC .................................. *H04L 43/50* (2013.01)

(58) Field of Classification Search
CPC ................................................ G06F 15/177
See application file for complete search history.

(56) References Cited

U.S. PATENT DOCUMENTS

| | | | |
|---|---|---|---|
| 6,505,249 B1* | 1/2003 | Rehkopf | H04L 29/06 702/182 |
| 6,513,024 B1* | 1/2003 | Li | G06N 99/005 706/13 |
| 6,668,340 B1* | 12/2003 | Baker | G06F 11/3688 714/26 |
| 8,276,123 B1* | 9/2012 | Deng | G06F 11/368 714/37 |
| 8,924,352 B1 | 12/2014 | Andruss et al. | |
| 2002/0138443 A1* | 9/2002 | Schran | G06Q 20/382 705/64 |
| 2004/0044992 A1* | 3/2004 | Muller | G06F 11/3684 717/124 |
| 2004/0044993 A1* | 3/2004 | Muller | G06F 11/3684 717/124 |
| 2004/0128651 A1* | 7/2004 | Lau | G06F 11/3664 717/124 |
| 2005/0015641 A1 | 1/2005 | Alur et al. | |
| 2007/0067587 A1 | 3/2007 | Rossi | |
| 2007/0143827 A1 | 6/2007 | Nicodemus et al. | |
| 2008/0059610 A1* | 3/2008 | Lin | G06F 9/5061 709/220 |
| 2008/0086719 A1* | 4/2008 | Clemenceau | G06F 9/44505 717/121 |
| 2008/0183309 A1* | 7/2008 | Beers | G06F 9/4411 700/17 |
| 2009/0187588 A1* | 7/2009 | Thambiratnam | G06F 17/30094 |
| 2010/0146514 A1* | 6/2010 | Alexander | G06F 11/3688 718/104 |
| 2011/0066708 A1* | 3/2011 | Schran | G06Q 20/382 709/221 |
| 2013/0019242 A1 | 1/2013 | Chen et al. | |
| 2013/0035909 A1* | 2/2013 | Douady | G06Q 40/06 703/2 |
| 2014/0279922 A1 | 9/2014 | Kottomtharayil | |

OTHER PUBLICATIONS

U.S. Appl. No. 13/781,347, Aithal et al., Wuji Chen.*
U.S. Appl. No. 13/781,376, filed Feb. 28, 2013, Aithal et al.
U.S. Appl. No. 13/781,407, filed Feb. 28, 2013, Aithal et al.

* cited by examiner

*Primary Examiner* — Philip Chea
*Assistant Examiner* — Wuji Chen
(74) *Attorney, Agent, or Firm* — Baker & Hostetler LLP

(57) ABSTRACT

Systems and methods are described for testing computing resources. In one embodiment, a request is received for testing a computing configuration. A set of computing settings that can be implemented on one or more computing devices is searched. An initial test population for testing the computing configuration is determined. The initial test population is iteratively updated based on test results and a fitness function.

21 Claims, 8 Drawing Sheets

TEST GENERATION SERVICE

CROSS REFERENCE TO RELATED APPLICATIONS

This application is related by subject matter to the following commonly assigned applications: U.S. patent application Ser. No. 13/781,376, entitled "AUTOMATED TEST GENERATION SERVICE" and U.S. patent application Ser. No. 13/781,407, entitled "LIVE DATA CENTER TEST FRAMEWORK," both filed on Feb. 28, 2013, the entirety of which are hereby incorporated by reference.

BACKGROUND

A data center is one example of a computing environment that houses computer systems and various networking, storage and other related components. Many organizations and businesses operate and maintain data centers to provide computing and information services to support their day-to-day operations. Data centers may also provide computing services on a permanent or an as-needed basis to businesses and individuals as a remote computing service or to provide "platforms as a service" or "software as a service" (e.g., cloud computing). The computing resources provided by a data center may include various types of resources, such as data processing resources, data storage resources, data communication resources and the like. To facilitate increased utilization of data center resources, virtualization technologies may allow a single physical computing machine to host one or more instances of virtual machines (VMs) that appear and operate as independent computer machines to a remotely connected computer user. Customers of a data center may sometimes request changes to a virtual machine instance or request a particular configuration. The data center may also add new computing resources or update existing computing resources. The data center may confirm that such updates and changes meet performance criteria.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

The following detailed description is directed to technologies for the automatic generation of tests in a computing environment. In the examples described herein, a data center is one example computing environment in which the described embodiments can be implemented. However, the described concepts can apply generally to other computing environments, for example across multiple data centers or locations.

In a computing environment such as a data center, numerous computing and network settings can be adjusted. For example, hardware settings such as firmware or Basic Input/Output System (BIOS) settings may be updated. Network settings and virtual machine settings may also be updated. One issue that may arise when altering such settings is how to test the new or updated settings. Because of the sheer number and variety of computing resources in a data center, it can be difficult to test and verify the changed settings, let alone characterize the changed settings with respect to specific performance metrics. It can also be difficult to automate and manage the testing of such settings in a production capacity.

The present disclosure describes a verification optimization system that takes as input a test objective (e.g., new hardware or software) and a test environment (e.g., network type, hardware, etc.). The verification optimization system may be configured to bias and analyze a number of test parameters and constraints (e.g., time and resources) and generate a test matrix or test population that optimizes the test coverage space given the test constraints. The verification optimization system may use search and optimization methods such as a fitness function to optimize the coverage. The verification optimization system can also be configured to interact with capacity management systems to create and manage test workflows by querying and changing computing settings, mapping the computing settings to specific hardware, changing and managing the settings in a controlled manner, execute the tests and removing/bringing affected devices back into service. The verification optimization system can thus be used as part of a test workflow for verifying performance and operation of computing configurations. The verification optimization system can also be used as part of a production workflow to configure and verify capacity at runtime so that system configurations with different computing settings can be available for customers.

Figure 1:
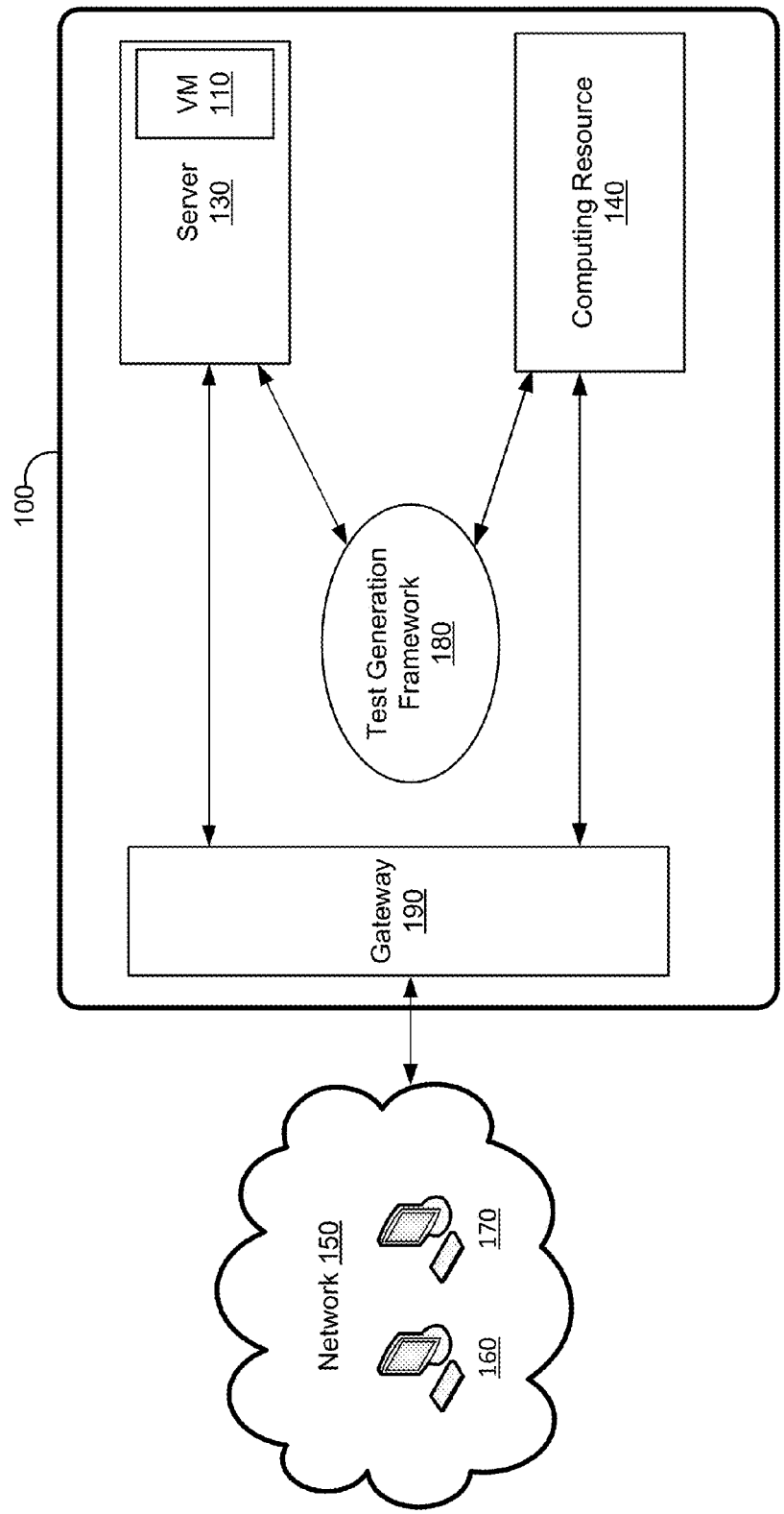
FIG. 1 is a diagram illustrating a mechanism for providing an automated test generation framework in accordance with the present disclosure.

FIG. 1 is a diagram illustrating a computing environment 100 including a mechanism for providing a verification optimization system in accordance with the present disclosure. In the present disclosure, a verification optimization system may also be referred to as a test matrix generation service, a test population generation service or an automated test generation framework. The terms may be used interchangeably. Referring to FIG. 1, computing environment 100 may include a virtual machine instance 110 that may execute, for example, on a server computer 130. It will be appreciated that some embodiments may involve additional virtual machine instances that may be instantiated on additional server computers in computing environment 100. Computing environment 100 may also include a computing resource 140 that may be, for example, a storage device or another computing device.

FIG. 1 also illustrates a public network 150 that may include one or more computing devices such as computers 160 and 170. According to one embodiment, virtual machine instance 110 may be configured to provide computing services to a computer user (not shown) of public network 150 via a gateway 190 and computers 160 and 170. For example, virtual machine instance 110 may provide a set of remote access enterprise applications to a group of users who may, for example, be employees of an enterprise customer.

A user, administrator, service or any computing resource in computing environment 100 may send a request to an automated test generation framework 180 for verification of a particular computing setting. Alternatively, the request may indicate that a computing device will be upgraded and that computing settings will be affected. In one embodiment, automated test generation framework 180 may access data indicating computing resources and their configurations, and which resources that have been determined to be capable of hosting and testing various computing settings. By accessing such data, computing automated test generation framework 180 can efficiently identify and allocate computing resources for responding to computing setting requests and verifying the settings. Such settings may be requested directly by a customer of the data center, by an administrator of the data center, a service or any computing resource within the data center such as server 130. Server 130 may also send a request on behalf of itself or on behalf of other servers.

The information regarding available computing devices for testing may be prioritized based on factors such as cost and policy information. Automated test generation framework 180 may access information describing test parameters and performance metrics or benchmarks, verification results and verification schedules. Automated test generation framework 180 may also access previously conducted verification results and verification schedules. Automated test generation framework 180 may send information regarding the test results to the requestor.

Figure 2:
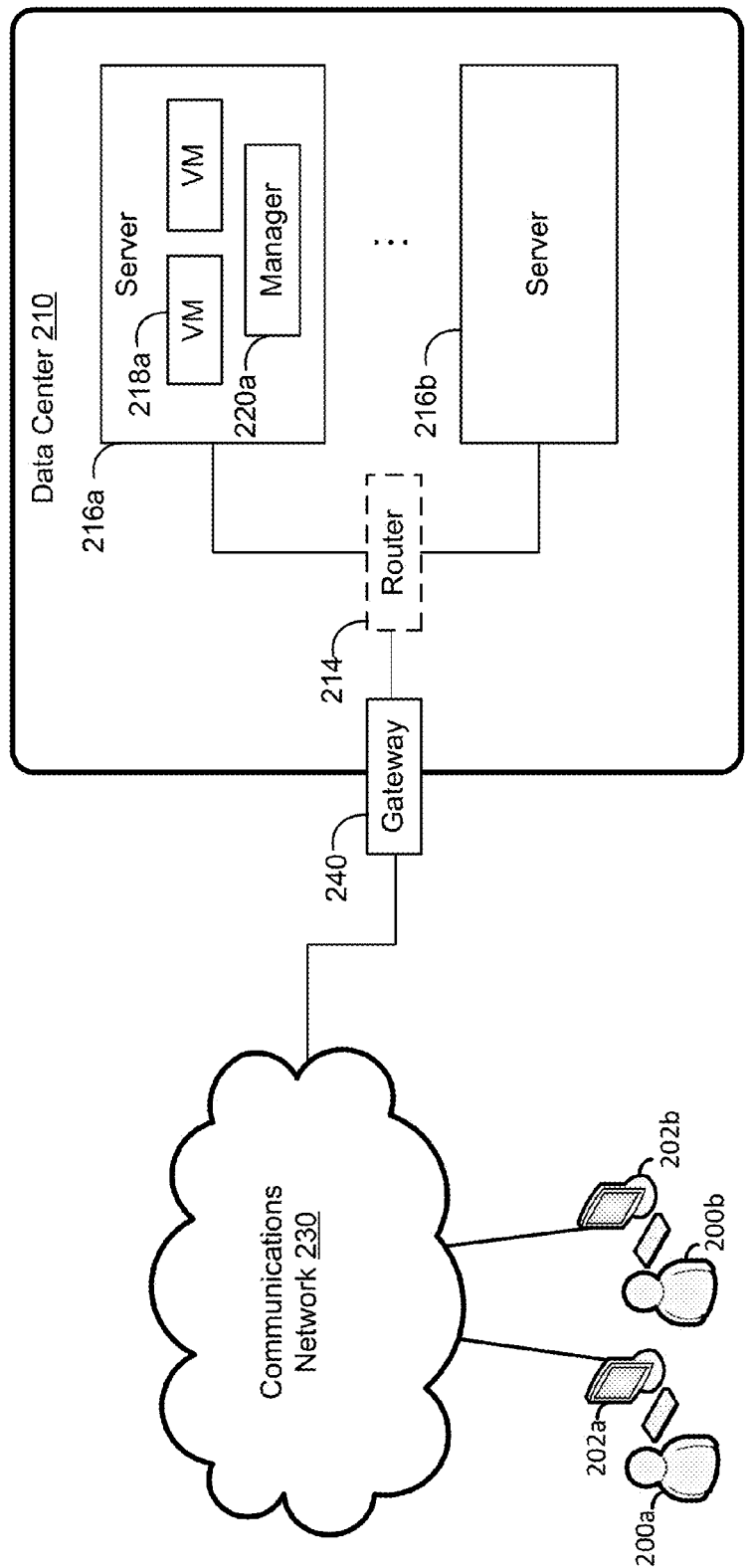
FIG. 2 illustrates an example computer system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may, for example, correspond to computing environment 100 in FIG. 1.

Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources—consisting of many processor cores, large amounts of memory and/or large storage capacity—and small resources—consisting of fewer processor cores, smaller amounts of memory and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218 (which may be referred herein singularly as "a virtual machine instance 218" or in the plural as "the virtual machine instances 218"). As shown in FIG. 2, at any given time some servers such as server 216a may host one or more virtual machine instances 218, while other servers such as server 216b do not host virtual machines. The virtual machine instances 218 may be configured to execute applications, including Web servers, application servers, media servers, database servers, and the like. Other resources that may be provided include data storage resources (not shown), and may include hard drives, solid state storage drives or other storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other users of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a (which may be referred herein singularly as "an instance manager 220" or in the plural as "the instance managers 220") capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210. In some embodiments, the auto scaling service may provide increased performance by adding more resources such as by adding virtual machine instances. In other embodiments, the auto scaling service may provide increased performance by changing or increasing the capacity of a virtual machine instance. For example, a user may be allocated a virtual machine instance on a server with a 1 Gbps network interface card (MC). During increased demand, the allocated virtual machine instance may be scaled to a different virtual machine instance on a server with a 10 Gbps NIC.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances and other types of information. The deployment component utilizes the customer-provided configuration to launch and configure customer workloads on computing resources.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

In a data center environment, it is desirable to test computing configurations by iterating through various settings in a controlled way to determine optimal test settings for a particular computing configurations. When new hardware configurations are added, for example, fleet fragmentation can result and the overall ability of the computing environment to meet performance goals and manage capacity can be compromised. By thoroughly testing computing configurations, it is possible to achieve greater integration of the computing configuration into the computing environment's products and services. And by testing a variety of configurations, a given set of hardware may be determined to be able to support a number of different computing settings. Pools or groupings of computing resources can be identified based on such capabilities and maintained based on frequently used settings and configurations.

When a customer requests a particular setting that requires a change to a computing setting that is not currently provided by the data center, a service in the data center such as automated test generation framework 180 of FIG. 1 that is implemented in one or more computing devices may be invoked. Automated test generation framework 180 may, in conjunction with other services, be configured to determine a suitable computing device that may can potentially accommodate the setting, initiate a workflow to update and validate the particular setting and report that the update has been verified and that the computing device is ready to provide the particular setting to the customer. The particular setting may also be made available to other customers who may request similar settings.

In various embodiments, an automated test generation framework such as automated test generation framework 180 of FIG. 1 may be implemented in one or more computing devices and configured to receive requests to verify computing settings. Automated test generation framework 180 may be configured to determine one or more test conditions that will verify the requested computing setting. Automated test generation framework 180 can be implemented across several computing devices or on one computing device.

Automated test generation framework 180 may create workflows to update and validate specific settings on specific resources (i.e., servers). Automated test generation framework 180 may also identify one or more resources that already include the requested setting or identify one or more settings that can be updated to provide the requested setting. For example, automated test generation framework 180 may track pools of resources (i.e., servers) that can support a given settings configuration. Automated test generation framework 180 may create also workflows to update and validate specific settings on specific computing resources. Automated test generation framework 180 may also be configured to optimize the placement for requested resources that have particular computing settings requirements based on various factors such as minimization of disruption to existing services.

In some embodiments, automated test generation framework 180 may be configured to interact with other computing environment services such as a fleet management service, a capacity pool management service and a configuration management service to provide the above described capabilities. For example, when a request for a computing setting is received and it is determined that the computing setting requires firmware changes that have not been previously verified, the configuration management service can identify a set of firmware settings that needs to be tested and verified to confirm that the settings meet the computing environment criteria. The configuration management service can also determine which of the settings are best suited to comply with the requested computing setting. Automated test generation framework 180 may determine a suitable test matrix and test the firmware settings.

In some embodiments, automated test generation framework 180 may be configured to include an expert system and a knowledge base to provide a decision-making capability regarding the search and selection of test conditions. The expert system can include, for example, an artificial intelligence (AI) system that includes or has access to historical data, a human system expert who can make decisions regarding the computing setting, a database of settings, and the like. The expert system can consider benchmarks or metrics such as system throughput, processor utilization and network bandwidth. Furthermore, automated test generation framework 180 may employ one or more fitness functions to determine how close a given test sample is to achieving one or more test objectives. The fitness function may be used to perform permutation testing and determine optimal test settings. In one embodiment, a genetic algorithm may be used as a search heuristic to efficiently determine searches for satisfactory test conditions.

When a change is implemented in a computing environment such as data center 210, it is desirable to perform one or more tests to verify that the change provides the functionality associated with the change and that the computing environment otherwise continues to function as expected and meets predetermined metrics or benchmarks. Changes that may be tested can include, for example, hardware or software changes, firmware changes or changes in a configuration or arrangement such as a change in the network topology. It can be appreciated that testing may be desirable in response to any number of changes within or outside the computing environment. The principles described herein are applicable to any situation where testing in a computing environment is desirable.

Many computing environments such as data centers are large and complex and can include a vast number of interconnected devices. Technologies such as virtualization can increase the complexity. Computing environments thus may include a mix of various types of data flowing through both virtual and physical components. Computing devices such as servers and routers may have complex interactions, and behaviors in one area can affect the performance of the entire computing environment. Changes in the computing environment should therefore be tested not only in its local environment but in conjunction with other devices in the computing environment to ensure that the computing environment on the whole provides an expected level of performance. Furthermore, the tests should be repeatable and relevant to metrics or benchmarks of interest. Metrics or benchmarks may include performance metrics that indicate how the computing environment performs under load. Performance metrics are useful for capacity planning and ensuring customer satisfaction. Such performance metrics may include throughput, latency and data loss.

As the number of computing devices in a computing environment increases, the scope of potential parameters, test interfaces and performance metrics may increase dramatically. This makes it extremely difficult for test administrators and planners to analyze the configurations and parameters to identify a set of tests that can verify the changes and satisfy applicable performance metrics.

In various embodiments disclosed herein, a computing environment such as data center 210 of FIG. 2 may implement a test framework such as automated test generation framework 180 of FIG. 1. Furthermore, the computing environment may maintain a database of information for tracking data related to various computing configurations including, for example, processors, network, disk and other peripheral devices, and test parameters. Search algorithms can be used to identify test a population or test matrix for testing a particular change or setting in the computing environment. In some embodiments, the test matrix or test population (the terms may be used interchangeably) may comprise a parameterized set of workload definitions, configuration management definitions, and/or performance parameters that are to be evaluated. A fitness function may be used to define cost and exit criteria and may be considered a part of the test population. Workload definitions may be determined as a function of the cost and configuration parameters being tested. The configuration management definitions may be a function of the configuration under test. As the complexity of a computing environment increases, the search space of possible test conditions can grow exponentially. In some cases, it may be difficult or impossible to identify a finite number of test conditions within a reasonable time and cost constraint that can completely verify a computing setting. In some embodiments, the search space may be analyzed to identify a candidate test population that satisfies a set of criteria or constraints. In one embodiment, the candidate test population may comprise a subset of possible test conditions that satisfy the criteria or constraints in accordance with a fitness function.

Accordingly, one or more metrics or benchmarks for evaluating the fitness of a parameter can be identified for the computing settings that are to be verified. Automated test generation framework 180 can then be used to generate tests to optimize the level and scope of verification within a set of constraints. Once a test population has been generated, automated test generation framework 180 may cause the automatic configuration of the settings on one or more computing devices in the computing environment. In an embodiment, the computing devices may be selected by mapping samples of the search space to available computing resources, modifying the computing resources and running tests on the modified computing resources. Additionally, the results of an initial test population can provide feedback to automated test generation framework 180 and can be used to determine a new set of test conditions to further optimize the test matrix.

As discussed above, a fitness function can be used to determine a matrix of test conditions to verify a change or setting. Any one of various fitness functions that can determine the closeness of a candidate solution to an objective can be used. A genetic function is one example of a heuristic search function that can be used for search and optimization of the test conditions. In one example of a typical genetic algorithm approach, an initial set of test conditions may be selected. In the present disclosure, a set of test conditions may include one or more settings in a computing environment that may be controlled (e.g., small network queue sizes vs. large network queue sizes). In some cases, a set of test conditions may be referred to as a test matrix or test population. After the initial set of test conditions has been selected, the fitness of each test condition may be evaluated. The fitness may be evaluated by using the fitness function to determine the closeness to a selected objective within a predetermined threshold. The fitness function will depend on the particular setting or metric that is to be measured. In some cases, a simulated approach such as computational fluid dynamics may be used to determine the fitness. Additional candidates can be identified based on cross-breeding as well as results of an initial round of tests. The fitness of new candidates can be evaluated and the process may be repeated until an outcome within a predetermined threshold has been reached. The predetermined outcome can be based on satisfaction of a minimum criterion or threshold or reaching an allocated budget. Another example of a predetermined outcome is reaching a point where additional iterations do not achieve produce appreciable changes in the results.

In one embodiment, candidates can be selected based on biasing to influence the selection. For example, the data in the sample space can be weighted to indicate relevance of the parameters to one or more metrics, thus resulting in an increased likelihood of optimizing around the selected metrics. In an embodiment, the sample space can include metadata to indicate biasing with respect to various parameters. The parameters can relate to system performance parameters (e.g., networking) or can be specific to hardware (e.g., disk drives and GPU). By using such metadata, the weights can indicate, for example, that some parameters are only relevant to certain metrics while having no impact on other metrics.

The weights can also be used to eliminate some variables from consideration. For example, in some cases the fitness of a particular sample may be zero, indicating that a particular setting is non-distinguishing for a given metric. In this case a zero weight can be used to indicate that a particular setting is unlikely to influence a given metric, thus reducing the potential scope of the test matrix.

In various embodiments, automated test generation framework 180 may employ probabilistic methods to guide and narrow the testing that is selected. In order to provide realistic test results that more closely verify actual behavior of the computing environment, the most relevant test parameters should be selected. However, the complexity of computing environments with hundreds or thousands of networked devices may preclude a deterministic or exhaustive solution. In some embodiments a heuristic model can be used to find satisfactory solutions that provide an acceptable confidence level in the results. For example, experiencebased techniques such as expert modeling can be used to aid initial selection of tests. The heuristic model can probabilistically indicate parameters of likely impact through, for example, tagging various metadata related to a particular metric. Feedback from an initial round of tests can be used to further refine the initial selection, thus implementing a closed loop system that generates high impact tests in situations where programmatic approaches may be impractical or infeasible. As an example, Markov modeling or variations thereof (e.g., hidden Markov model and hierarchical hidden Markov model) can be used in some embodiments to identify solutions that may otherwise be missed using traditional methods. Monte Carlo methods, finite element analysis and computational fluid analysis can also be used to generate results in various embodiments.

In many computing environments the amount of resources available for testing may be limited at any given time. For example, in a typical data center the majority of resources may continuously be in use in order to provide services for customers. In some embodiments, automated test generation framework 180 may interact with a fleet management system. For example, automated test generation framework 180 may interact with a capacity management system to identify spare or otherwise usable computing resources for testing the settings. Additionally, the samples selected for testing can be based on availability of spare resources and the configuration of the spare resources. For example, the available test resources may include configurations that deviate from the initially selected test matrix. The variances in the test resources from the test matrix may be used to generate a best available solution and update the test matrix.

In some embodiments, automated test generation framework 180 may interact with a configuration management system that may be implemented in the computing environment and configured to manage configurations. Such a configuration management system may create and manage workflows and map configurations to computing devices in the computing environment. The configuration management system can be part of a test workflow for verifying performance and operation of various configurations. The configuration management system may further comprise additional subsystems such as a firmware management subsystem that manages firmware settings in the computing environment.

Automated test generation framework 180 may interact with the configuration management system and map desired settings to available settings in the computing environment. The available test resources may be evaluated to determine the particular settings that are implemented on the test resources. The settings that need to be changed to conform to the desired test settings may be evaluated to determine the scope of required changes and the cost associated with updating the test resources. The cost associated with updating the test resources may be balanced against the value of implementing the exact desired settings to determine if the settings should be implemented. Automated test generation framework 180 may thus incorporate a cost evaluation mechanism that uses cost thresholds to determine if available settings are sufficiently close to the desired settings and if the costs associated with updating the settings will provide results of sufficient value. The information from the cost evaluation mechanism may be provided as additional input to the search algorithms to identify an optimized test matrix that considers cost thresholds. In one embodiment, automated test generation framework 180 may interact with the configuration management system to determine available test resources and integrate information regarding available settings and costs associated with the available settings to achieving a desired population state and determine and adjust the next set of tests. In some embodiments, the cost evaluation mechanism can include an algorithm such as a logic function that inputs various factors such as monetary value of one or more resources required for testing and a total maximum cost threshold. The cost evaluation mechanism may be configured to analyze the inputs and determine which test resources may be available to perform testing based on the inputs.

By interacting with a fleet management infrastructure that may include a configuration management system and other fleet management subsystems, automated test generation framework 180 can determine costs associated with loss of revenue when candidate test resources are pulled from production. The cost of removing a particular candidate resource from production can be determined based on current market conditions for the services provided by the resource. This cost can be compared to the value of testing the particular set of conditions to determine if the benefit of testing exceeds the cost of pulling the resource. For example, a current cost per minute of pulling a resource and the expected time to conduct a set of tests may be determined. If the current cost per minute falls below a predetermined level, the automated test generation framework can occupy the resource and conduct the tests.

Figure 3:
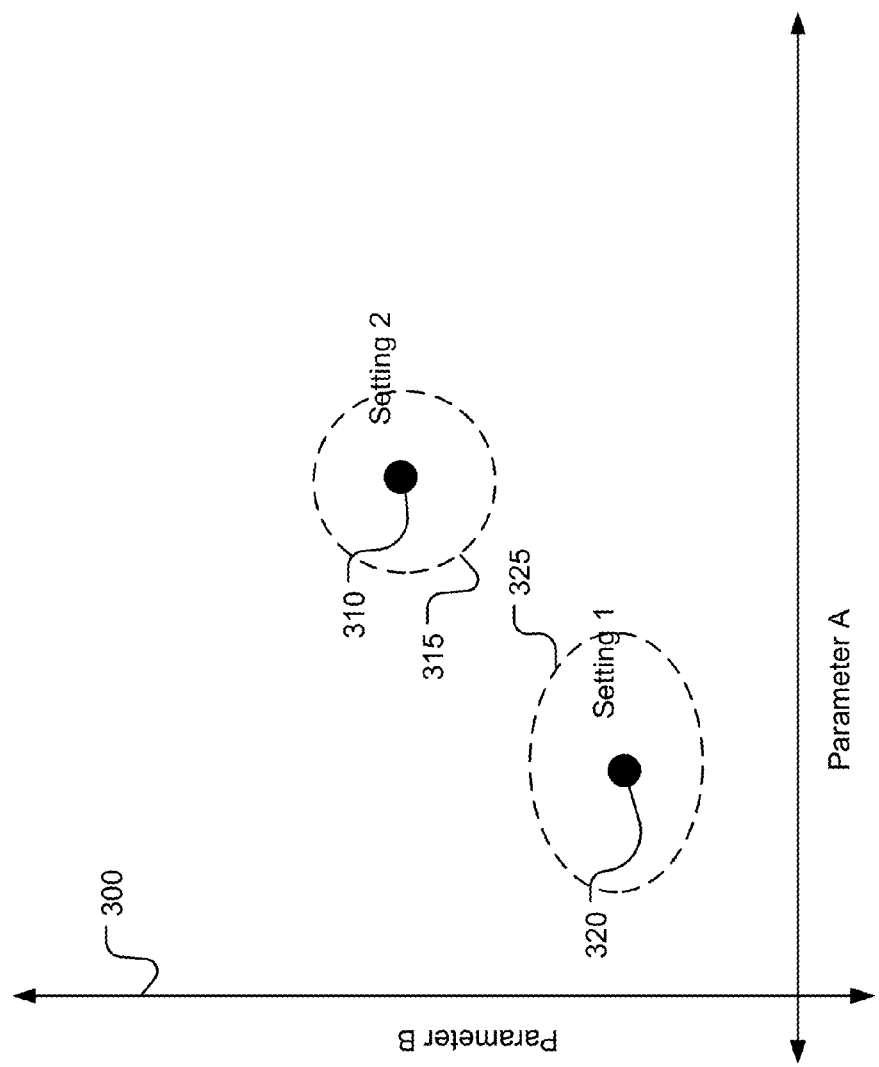
FIG. 3 is a diagram illustrating test coverage of computing settings.

FIG. 3 illustrates an example searching parameters in an automated test generation system. FIG. 3 includes a two dimensional graph 300 that indicates possible settings for a Parameter A and Parameter B. Candidate setting 310 and candidate setting 320 illustrate two sample points from a search space that may be evaluated for a generated test matrix. Corresponding areas of coverage area 315 corresponding to setting 310 and coverage area 320 corresponding to setting 325 may be evaluated to determine if the covered regions sufficiently cover the sample space in accordance with a fitness function.

Figure 4:
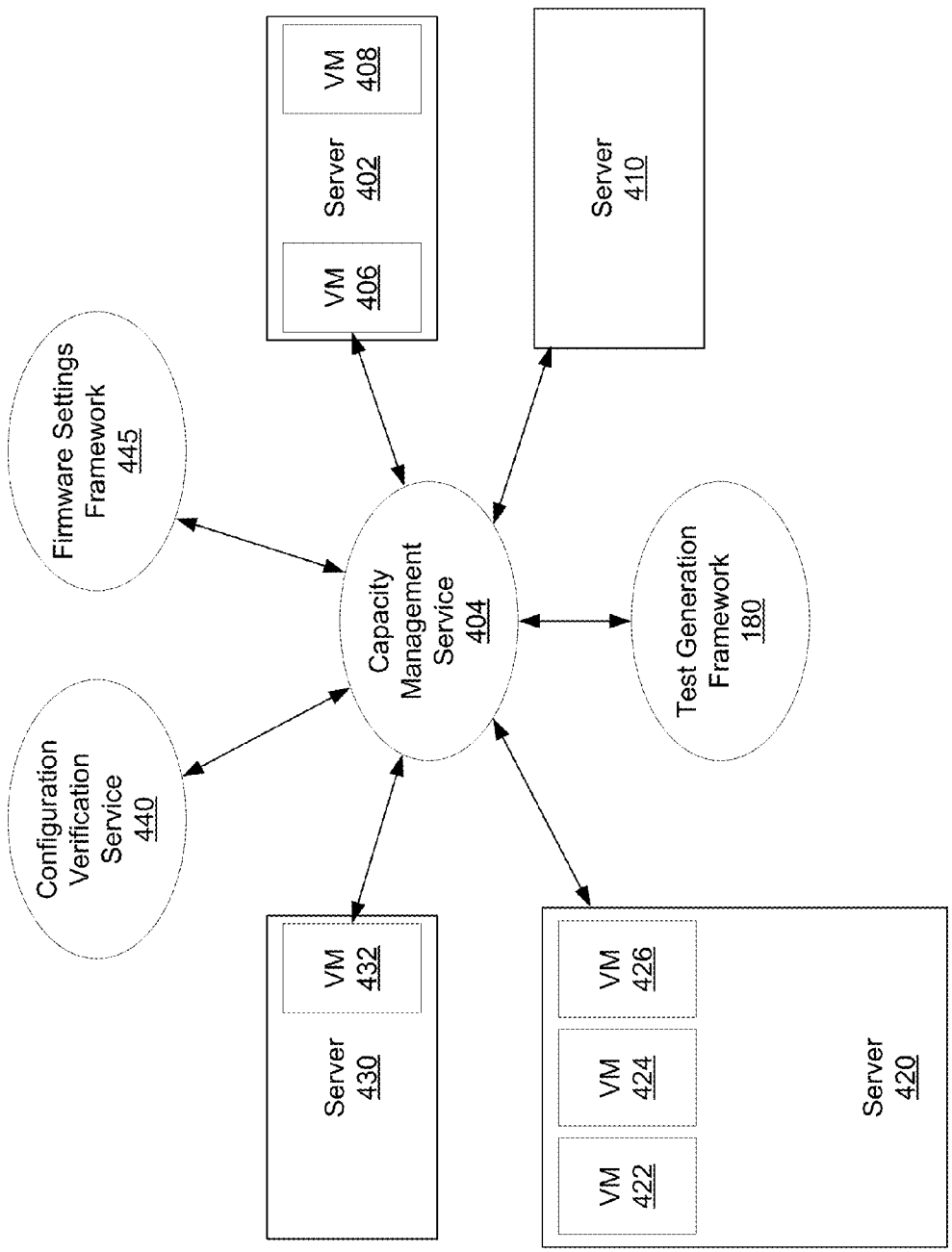
FIG. 4 is a diagram illustrating a mechanism for providing an automated test generation framework in accordance with the present disclosure.

FIG. 4 illustrates an example computing environment in which the embodiments described herein may be implemented. Referring to the figure, server computers 402, 410, 420 and 430 may communicate with a capacity management service 404 to provide configuration information. Server computer 402 may host virtual machine instances 406 and 408. Similarly, server computer 410 may host virtual machine instance 412; server computer 420 may host virtual machine instances 422, 424 and 426; and server computer 430 may host virtual machine instance 432.

Server computer 402 may send a request for an updated computing configuration to capacity management service 404. Capacity management service 404 may interact with configuration verification service 440 to request verification of the updated computing configuration. Configuration verification service 440 may identify requirements for configuring an available server computer that can support the updated computing configuration. For example, requirements may include device hardware and any software or firmware that needs to be installed, or execution of a test to verify that a virtual computing instance of a particular type can function with updated computing configuration. The information may also indicate when evaluation tasks can be performed. For example, the information may include an evaluation schedule that minimizes potential disruptions to existing services being provided to customers.

Server computer 402 may also send a request for an updated computing configuration to firmware settings framework 445. In some embodiments, firmware settings framework 445 may access a list of available firmware baseline configurations. Firmware settings framework 445 may also maintain a record of groupings of computing resources that have been determined to be capable of meeting a predetermined baseline firmware configuration. By maintaining such groupings, computing firmware settings framework 445 can efficiently identify and allocate computing resources for responding to firmware setting requests. Such settings may be requested directly by a customer of the data center, by an administrator of the data center, a service or any computing resource within the data center such as server 430. Firmware settings framework 445 may interact with configuration verification service 440 to request verification of the updated firmware configuration.

Configuration verification service 440 may interact with test generation framework 180 that may automatically generate a test matrix based on desired test objectives, the available server computer and its configuration and cost considerations. Test generation framework 180 may cause the conduct of verification tests and further update the test matrix based on the tests.

Test generation framework 180 may reside on one or more server computers or other computing resources in a data center. Test generation framework 180 may in some embodiments be managed by a VMM or other management software executing in the data center. Test generation framework 180 may also execute on one or more virtual machines.

Figure 5:
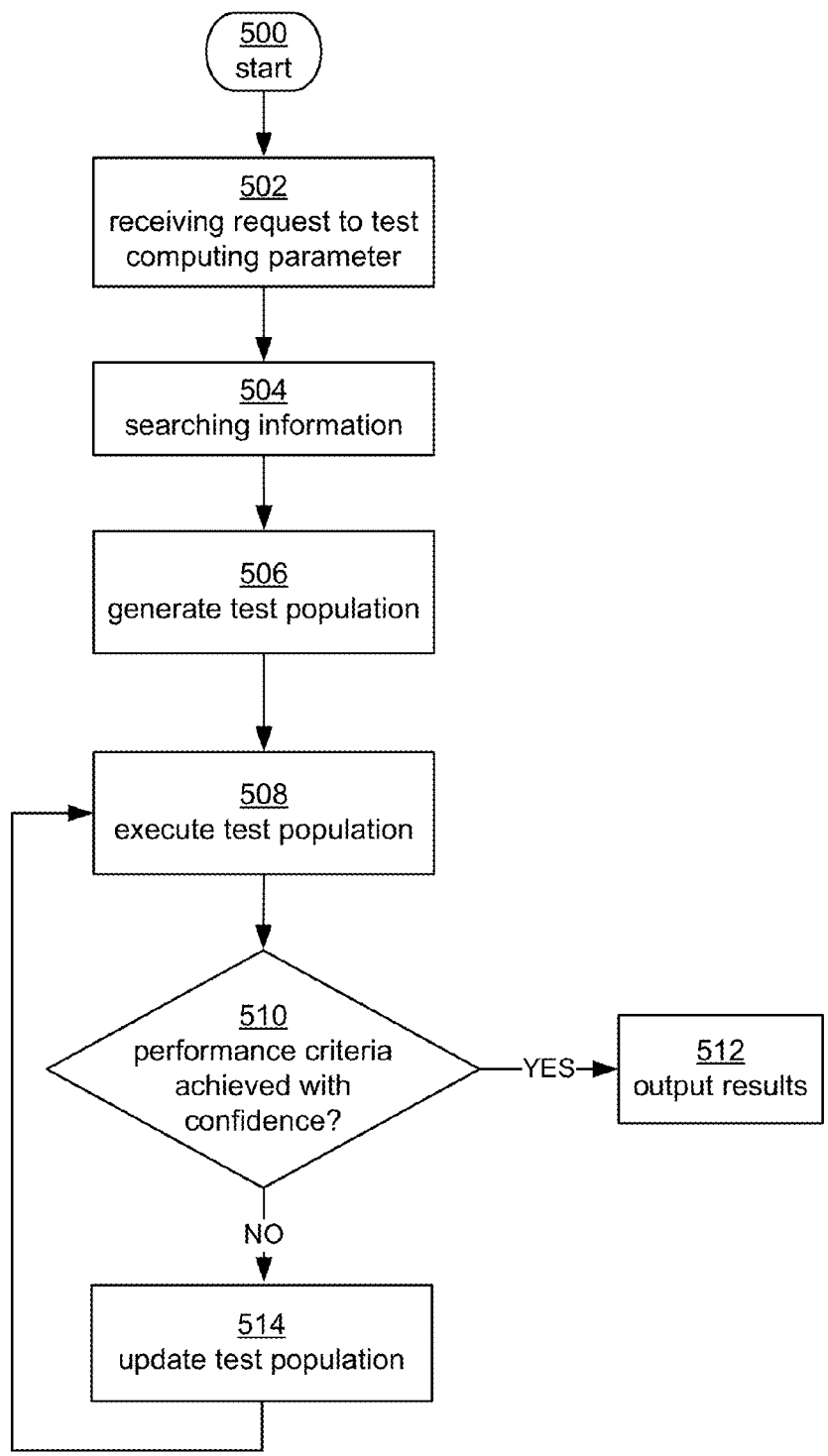
FIG. 5 is a flowchart depicting an example procedure for providing an automated test generation framework in accordance with the present disclosure.

FIG. 5 illustrates an example operational procedure for testing in a computing environment using an automated test generation framework. In an embodiment, an automated test generation framework can correspond to automated test generation framework 180 in FIG. 1.

Referring to FIG. 5, operation 500 begins the operational procedure. Operation 500 may be followed by operation 502. Operation 502 illustrates receiving a request to test a computing parameter. In an embodiment, the request may be received in a computing environment comprising a plurality of computing devices providing computing resources.

Operation 502 may be followed by operation 504. Operation 504 illustrates searching information comprising settings that can be controlled on one or more computing devices in the computing environment. In some embodiments, the searching may be based on metadata indicative of relationships between the settings and corresponding weighted performance metrics. Additionally or optionally, the searching may be aided by expert intervention.

Operation 504 may be followed by operation 506. Operation 506 illustrates generating a test population that verifies the computing parameter in accordance with a set of constraints for bounding a cost associated with the test population. In an embodiment, the test population may comprise a parameterized set of workload definitions, configuration management definitions, and/or performance parameters that are to be evaluated. A fitness function may be used to define cost and exit criteria and may be considered a part of the test population. Workload definitions may be determined as a function of the cost and configuration parameters being tested. The configuration management definitions may be a function of the configuration under test.

Operation 506 may be followed by operation 508. Operation 508 illustrates executing the test population. Operation 508 may be followed by operation 510. If execution of the test population demonstrates the desired performance criteria within an acceptable confidence level and does not require further updates, then operation 510 may be followed by operation 512. Operation 512 illustrates outputting the test population and/or the test results.

If the test population requires further updates, then operation 510 may be followed by operation 514. Operation 514 illustrates updating the test population. Operation 514 may be followed by operation 508.

Figure 6:
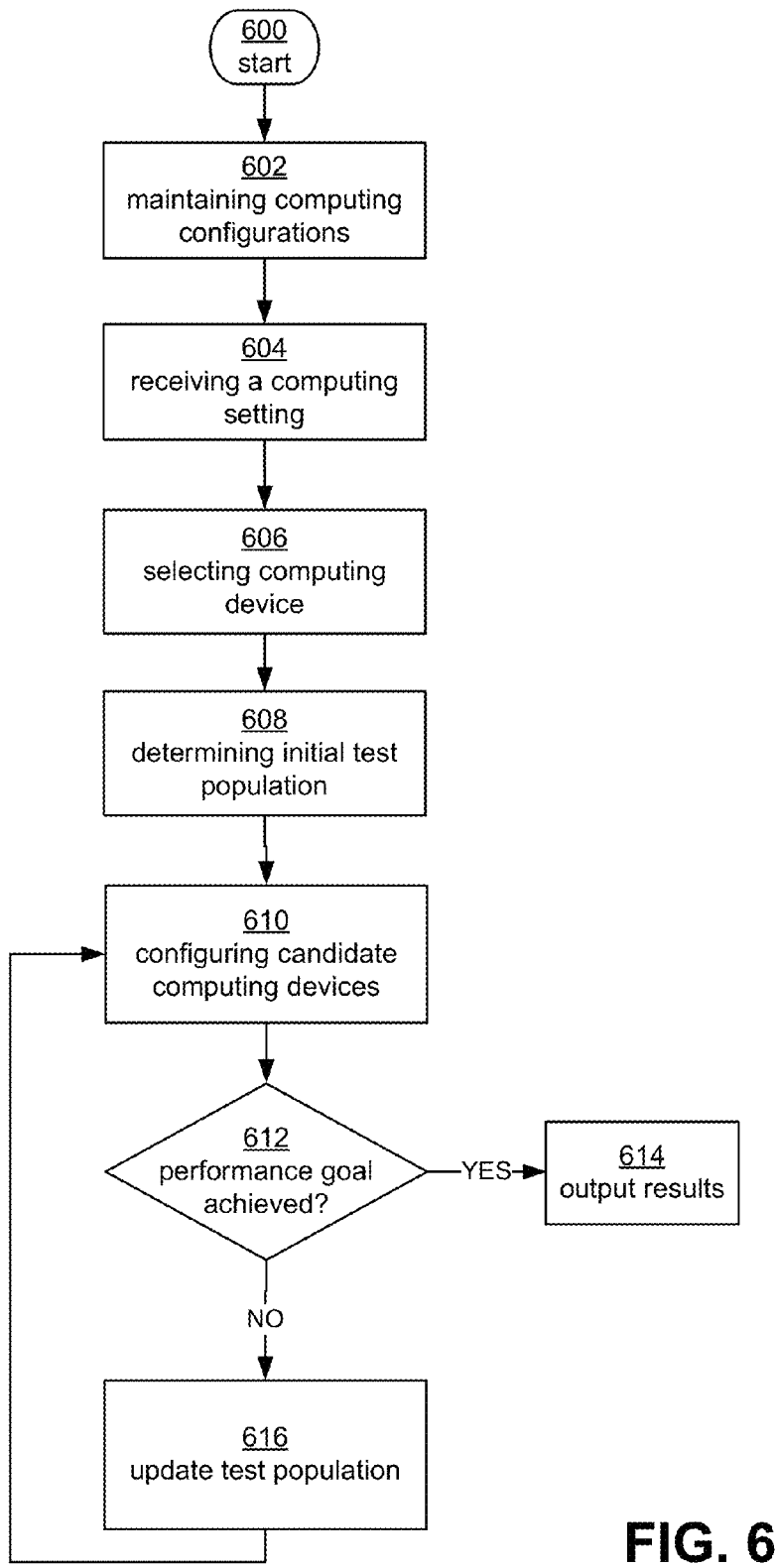
FIG. 6 is a flowchart depicting an example procedure for providing an automated test generation framework in accordance with the present disclosure.

FIG. 6 illustrates an example operational procedure for testing in a computing environment using an automated test generation framework. In an embodiment, an automated test generation framework can correspond to automated test generation framework 180 in FIG. 1.

Referring to FIG. 6, operation 600 begins the operational procedure. Operation 600 may be followed by operation 602. Operation 602 illustrates maintaining computing configurations in a data center comprising a plurality of computing devices. Operation 602 may be followed by operation 604. Operation 604 illustrates receiving a computing setting related to the data center.

Operation 604 may be followed by operation 606. Operation 606 illustrates searching the computing configurations for computing devices in the data center and selecting one or more of the computing devices for testing the computing setting based on a set of constraints. Operation 606 may be followed by operation 608. Operation 608 illustrates determining an initial test population for testing the computing setting based on metadata indicative of relationships between the setting and corresponding weighted performance metrics. Operation 608 may be followed by operation 610. Operation 610 illustrates configuring the selected one of the computing devices in accordance with the test population.

Operation 610 may be followed by operation 612. If the initial set of test population does not require further updates based on results from the testing or fitness analysis and determining whether performance goals have been achieved, then operation 612 may be followed by operation 614. Operation 614 illustrates outputting the test population and/or the test results.

If the initial set of test population requires further updates, then operation 612 may be followed by operation 616. Operation 616 illustrates updating the test population. Operation 616 may be followed by operation 610.

Figure 7:
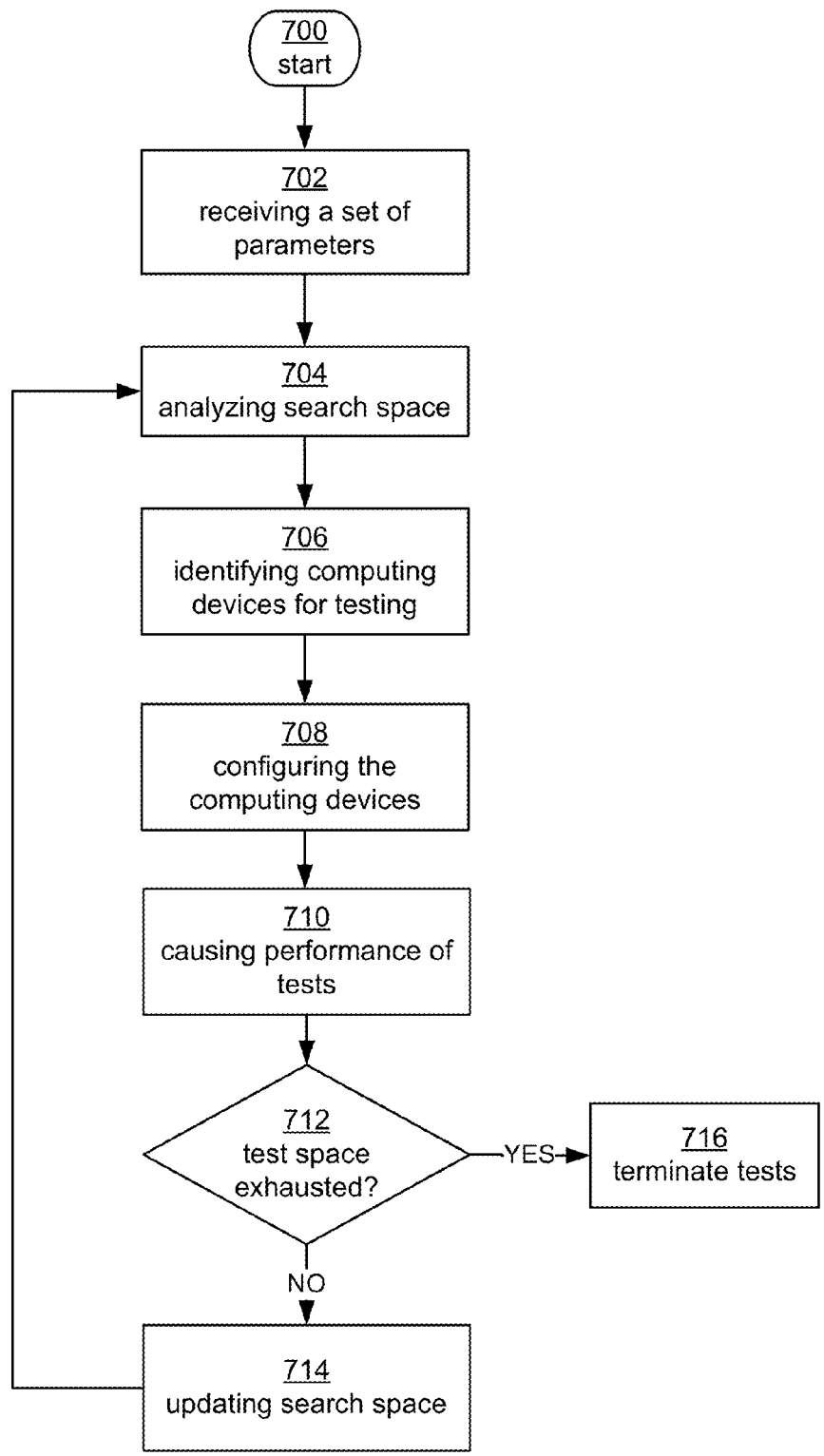
FIG. 7 is a flowchart depicting an example procedure for providing an automated test generation framework in accordance with the present disclosure.

FIG. 7 illustrates an example operational procedure for testing in a computing environment in a data center using an automated test generation framework. In an embodiment, an automated test generation framework can correspond to automated test generation framework 180 in FIG. 1.

Referring to FIG. 7, operation 700 begins the operational procedure. Operation 700 may be followed by operation 702. Operation 702 illustrates receiving a set of parameters in a computing environment comprising a plurality of computing devices.

Operation 702 may be followed by operation 704. Operation 704 illustrates analyzing a search space of computing settings and selecting a subset of the computing settings based a selection function to generate a test matrix for testing the set of parameters. Operation 704 may be followed by operation 706. Operation 706 illustrates identifying one or more computing devices in the computing environment for testing the set of parameters. In an embodiment, the identifying can be based on criteria for managing availability of the computing devices.

Operation 706 may be followed by operation 708. Operation 708 illustrates automatically configuring the one or more computing devices in accordance with the test matrix. Operation 708 may be followed by operation 710. Operation 710 illustrates causing performance of tests in accordance with the test matrix and iteratively updating the test matrix based on results of the testing and a fitness function.

Operation 710 may be followed by operation 712. If tests have been verified in accordance with performance characteristics based on a predetermined threshold, then operation 712 may be followed by operation 716. Operation 716 illustrates terminating the tests. If tests have not been verified in accordance with performance characteristics based on a predetermined threshold, then operation 712 may be followed by operation 714 Operation 714 illustrates updating the search space based on the test results. In some embodiments, weighted parameters in the search space can be adjusted to indicate relevance to one or more performance metrics, thus resulting in an increased likelihood of optimizing around metrics of interest while eliminating some parameters from that are less relevant to the metrics of interest. For example, the weights can be adjusted to avoid running tests that do not result in any significant effect on selected performance metrics.

Figure 8:
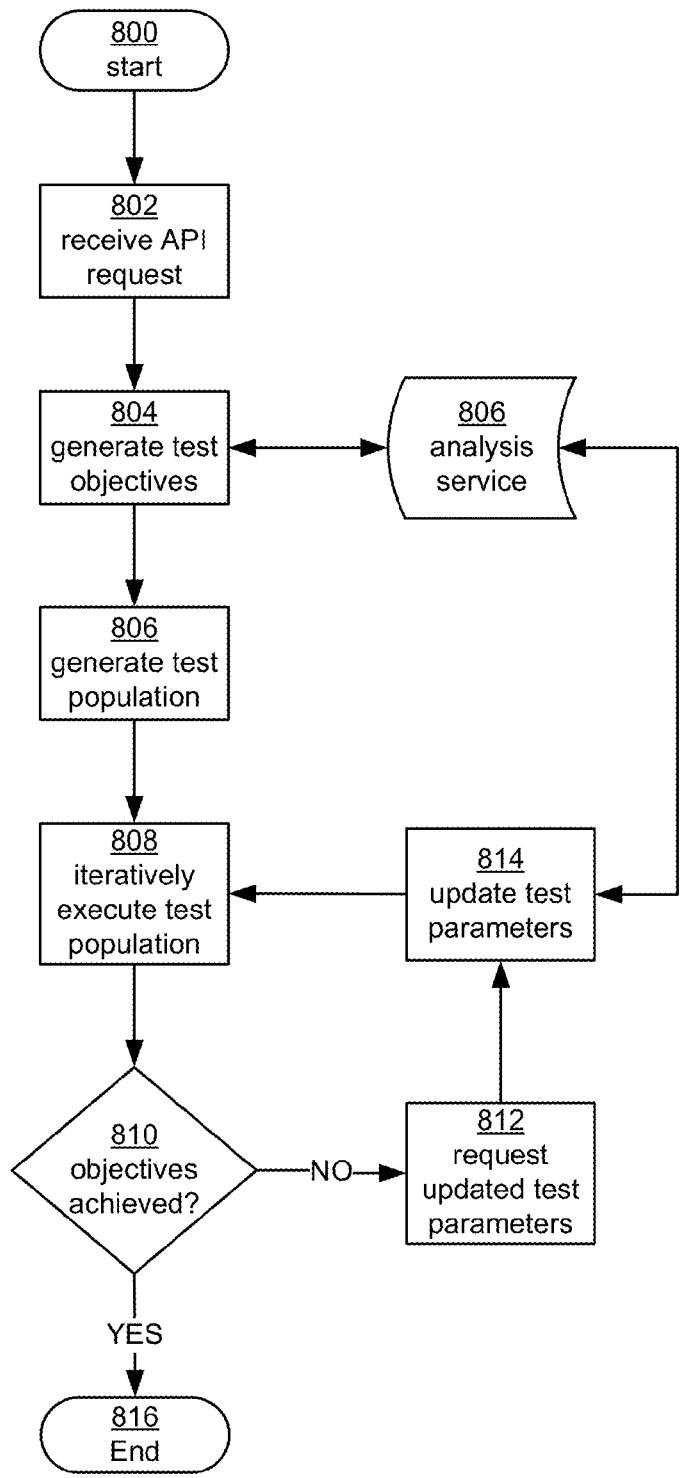
FIG. 8 is a flowchart depicting an example procedure for providing an automated test generation framework in accordance with the present disclosure.

FIG. 8 illustrates an example operational procedure for testing in a computing environment using an automated test generation framework. In an embodiment, an automated test generation framework can correspond to automated test generation framework 180 in FIG. 1.

Referring to FIG. 8, operation 800 begins the operational procedure. Operation 800 may be followed by operation 802. Operation 802 illustrates receiving a request via an API. In an embodiment, the request can be for testing of a computing parameter.

Operation 802 may be followed by operation 804. Operation 804 illustrates generating test objectives that verify the received request. The generation of test objectives may be informed by analysis service 806. In various embodiments, analysis service 806 can comprise one or more of querying a database for historical data, expert (e.g., human) intervention, and/or expert system intervention (e.g., a fitness function).

Operation 804 may be followed by operation 806. Operation 806 illustrates generating a test population that verifies the test objectives. In an embodiment, the test population may comprise a parameterized set of workload definitions, configuration management definitions, and/or performance parameters that are to be evaluated. A fitness function may be used to define cost and exit criteria and may be considered a part of the test population. Workload definitions may be determined as a function of the cost and configuration parameters being tested. The configuration management definitions may be a function of the configuration under test.

Operation 806 may be followed by operation 808. Operation 808 illustrates iteratively executing the test population. Operation 808 may be followed by operation 810. If execution of the test population demonstrates the desired objectives within an acceptable confidence level and does not require further updates, then operation 810 may be followed by operation 816.

If the objectives have not been achieved, then operation 810 may be followed by operation 812. Operation 812 illustrates generating a request for updated test parameters. Operation 812 may be followed by operation 814. Operation 814 illustrates updating the test parameters. Operation 814 may be followed by operation 808. In some embodiments, analysis service 806 may provide input to the updating of test parameters.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   at least one computing device; and
   at least one memory in communication with the at least one computing device, the at least one memory having stored therein computer instructions that, upon execution by the computing system, at least cause the computing system to:
   receive a request to test a computing parameter in a computing environment comprising a plurality of computing resources;
   in response to the request, search information comprising settings that can be controlled on the computing resources in the computing environment, said searching based on metadata indicative of relationships between the settings and corresponding weighted performance metrics, wherein, for at least a first performance metric and at least a first setting, a weight for the first performance metric is indicative of a relevance of the first setting to the first performance metric, and wherein meeting of the first performance metric by testing verifies that the first setting provides functionality associated with the first setting; and
   based on the searching, generate a test population that verifies the computing parameter in accordance with a set of constraints for bounding a cost associated with the test population.

2. The computing system according to claim 1, wherein the test population is generated based on metrics for evaluating fitness of the settings in accordance with a fitness function.

3. The computing system according to claim 1, further comprising mapping the settings to a selected computing resource in the computing environment, changing a configuration of the selected computing resource and running tests on the selected_ computing resource.

4. The computing system according to claim 3, further comprising computer instructions that, upon execution by the computing system, at least cause the computing system to update the test population based on test results.

5. The computing system according to claim 1, wherein the settings comprise at least one of a hardware setting, a network setting, or a virtual machine type.

6. A computer-implemented method for testing in a computing environment comprising a plurality of computing resources associated with a set of services, the method comprising:
   in response to receiving a request for testing a computing configuration of the computing environment, searching a set of computing settings that can be implemented on one or more of the plurality of computing resources in the computing environment and determining an initial test population for testing the computing configuration, said searching based on metadata indicative of relationships between the computing settings and corresponding weighted performance metrics, wherein, for at least a first performance metric and at least a first computing setting, a weight for the first performance metric is indicative of a relevance of the first computing setting to the first performance metric, and wherein meeting of the first performance metric by testing verifies that the first computing setting provides functionality associated with the first computing setting; and
   iteratively updating the initial test population based on results of said testing and a fitness function usable to determine a relevance of the computing settings to one or more performance metrics.

7. The method of claim 6, wherein the request is received via an application programming interface (API).

8. The method of claim 6 wherein the fitness function comprises a genetic algorithm.

9. The method of claim 6, wherein the computing settings are biased to indicate relevancy according to the one or more performance metrics.

10. The method of claim 9, wherein the computing settings are further biased using an expert model.

11. The method of claim 6 wherein the computing settings are selected using a hidden Markov model.

12. The method of claim 6, wherein the test population is used to verify the computing configuration in accordance with a set of constraints for bounding a cost associated with the test population.

13. The method of claim 12 wherein the cost is bounded in accordance with one or more constraints including a monetary value and a logic function.

14. The method of claim 6 further comprising mapping the settings to a selected computing resource and verifying the test population on the selected computing resource.

15. The method of claim 6 wherein the test population is determined based on a probabilistic model.

16. The method of claim 15 wherein the probabilistic model is a Monte Carlo method.

17. One or more non-transitory computer-readable storage media having collectively stored thereon executable instructions that, when executed by one or more processors of a computer system, cause the computer system to at least implement:
   an application programming interface sub-system configured to:
   access metadata of a test generation framework, the metadata determined based on relationships between parameters of the test generation framework and corresponding settings of one or more computing devices in a computing environment, wherein the metadata includes an indication of relevance of the settings to one or more weighted performance metrics for the computing environment, wherein, for at least a first performance metric and at least a first setting, a weight for the first performance metric is indicative of a relevance of the first setting to the first performance metric, and wherein meeting of the first performance metric by testing verifies that the first setting provides functionality associated with the first setting;

receive an electronic message that encodes an identifier indicative of the first setting; and in response to receiving the electronic message, determining a test population for testing the first setting indicated by the electronic message based on the metadata.

18. The non-transitory computer-readable storage media of claim 17 wherein the test population is selected based on metrics for evaluating fitness of the settings in accordance with a fitness function.

19. The non-transitory computer-readable storage media of claim 17 wherein the test population is selected in accordance with a set of constraints for bounding a cost associated with the test population.

20. The non-transitory computer-readable storage media of claim 17 wherein the metadata is determined based in part on availability of the one or more computing devices provided by a configuration verification service.

21. The non-transitory computer-readable storage media of claim 17 wherein the metadata is determined based in part on availability of the one or more computing devices provided by a capacity management service, the availability based on data indicative of how computing resources are being utilized by one or more users.

* * * * *